US011906916B2

(12) United States Patent
Furuichi et al.

(10) Patent No.: US 11,906,916 B2
(45) Date of Patent: Feb. 20, 2024

(54) HEATING DEVICE, FIXING DEVICE, DRYING DEVICE, LAMINATOR, AND IMAGE FORMING APPARATUS

(71) Applicants: Yuusuke Furuichi, Kanagawa (JP); Hiroshi Seo, Kanagawa (JP); Tomoya Adachi, Kanagawa (JP); Daisuke Hirano, Kanagawa (JP)

(72) Inventors: Yuusuke Furuichi, Kanagawa (JP); Hiroshi Seo, Kanagawa (JP); Tomoya Adachi, Kanagawa (JP); Daisuke Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/739,509

(22) Filed: May 9, 2022

(65) Prior Publication Data

US 2022/0382191 A1 Dec. 1, 2022

(30) Foreign Application Priority Data

May 31, 2021 (JP) ................................ 2021-091417

(51) Int. Cl.
*G03G 15/20* (2006.01)

(52) U.S. Cl.
CPC ................................ *G03G 15/2053* (2013.01)

(58) Field of Classification Search
CPC ............. G03G 15/206; G03G 15/2017; G03G 15/2053; G03G 2215/2003
See application file for complete search history.

(56) References Cited

U.S. PATENT DOCUMENTS

2005/0135848 A1 6/2005 Kagawa et al.
2016/0252859 A1* 9/2016 Tsunoda ............ G03G 15/2064 399/329
2019/0179242 A1 6/2019 Adachi et al.
2019/0278206 A1 9/2019 Adachi et al.
2019/0286026 A1 9/2019 Furuichi et al.
2019/0286027 A1 9/2019 Someya et al.
2019/0286028 A1 9/2019 Furuichi et al.
2020/0033768 A1* 1/2020 Furuichi ............... G03G 15/80
2020/0033771 A1 1/2020 Furuichi et al.
2020/0033776 A1 1/2020 Yoshinaga et al.
(Continued)

FOREIGN PATENT DOCUMENTS

JP 9-134085 5/1997
JP 2009-093017 A 4/2009
(Continued)

OTHER PUBLICATIONS

JP 2009093017 English machine translation, Suzumi et al., Apr. 30, 2009 (Year: 2009).*
(Continued)

*Primary Examiner* — Thomas S Giampaolo, II
(74) *Attorney, Agent, or Firm* — Harness, Dickey & Pierce, P.L.C.

(57) ABSTRACT

A heating device includes a planar heater, a rotator, a pressure rotator, a heating device frame, a resistor, and a discharger. The pressure rotator has a conductive outer surface and presses the rotator. The heating device frame holds the pressure rotator. The discharger is in contact with the conductive outer surface of the pressure rotator and grounded via the resistor and the heating device frame.

15 Claims, 11 Drawing Sheets

(56) References Cited

U.S. PATENT DOCUMENTS

| | | | |
|---|---|---|---|
| 2020/0103796 | A1 | 4/2020 | Furuichi et al. |
| 2020/0103797 | A1 | 4/2020 | Furuichi |
| 2020/0103803 | A1 | 4/2020 | Furuichi |
| 2020/0103814 | A1 | 4/2020 | Someya et al. |
| 2020/0117124 | A1 | 4/2020 | Furuichi |
| 2020/0117125 | A1 | 4/2020 | Furuichi |
| 2020/0174407 | A1 | 6/2020 | Furuichi |
| 2020/0174408 | A1 | 6/2020 | Furuichi et al. |
| 2020/0183307 | A1 | 6/2020 | Furuichi et al. |
| 2020/0249601 | A1 | 8/2020 | Inoue et al. |
| 2020/0249604 | A1 | 8/2020 | Adachi et al. |
| 2020/0292972 | A1 | 9/2020 | Inoue et al. |
| 2021/0011400 | A1 | 1/2021 | Seshita et al. |
| 2021/0278790 | A1 | 9/2021 | Furuichi et al. |

FOREIGN PATENT DOCUMENTS

| | | |
|---|---|---|
| JP | 2014-170225 | 9/2014 |
| JP | 2015-114508 | 6/2015 |
| JP | 2020-052345 | 4/2020 |

OTHER PUBLICATIONS

Extended European Search Report dated Nov. 2, 2022 issued in corresponding European Appln. No. 22170857.1.

* cited by examiner

HEATING DEVICE, FIXING DEVICE, DRYING DEVICE, LAMINATOR, AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-091417, filed on May 31, 2021, in the Japan Patent Office, the entire disclosure of which is hereby incorporated by reference herein.

BACKGROUND

Technical Field

Embodiments of the present disclosure generally relate to a heating device, a fixing device, a drying device, a laminator, and an image forming apparatus.

Related Art

A heating device in a fixing device includes a fixing belt as a rotator and a pressure roller as a pressure rotator. While a sheet passes through a fixing nip formed between the fixing belt and the pressure roller, toner on the sheet is heated and pressed.

SUMMARY

This specification describes an improved heating device that includes a planar heater, a rotator, a pressure rotator, a heating device frame, a resistor, and a discharger. The pressure rotator has a conductive outer surface and presses the rotator. The heating device frame holds the pressure rotator. The discharger is in contact with the conductive outer surface of the pressure rotator and grounded via the resistor and the heating device frame.

This specification also describes a fixing device that includes the heating device. This specification further describes a dryer including the heating device.

This specification further describes a laminator including the heating device.

This specification further describes an image forming apparatus including the heating device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a perspective view of a heater unit including a heater and the like;

Figure 1:
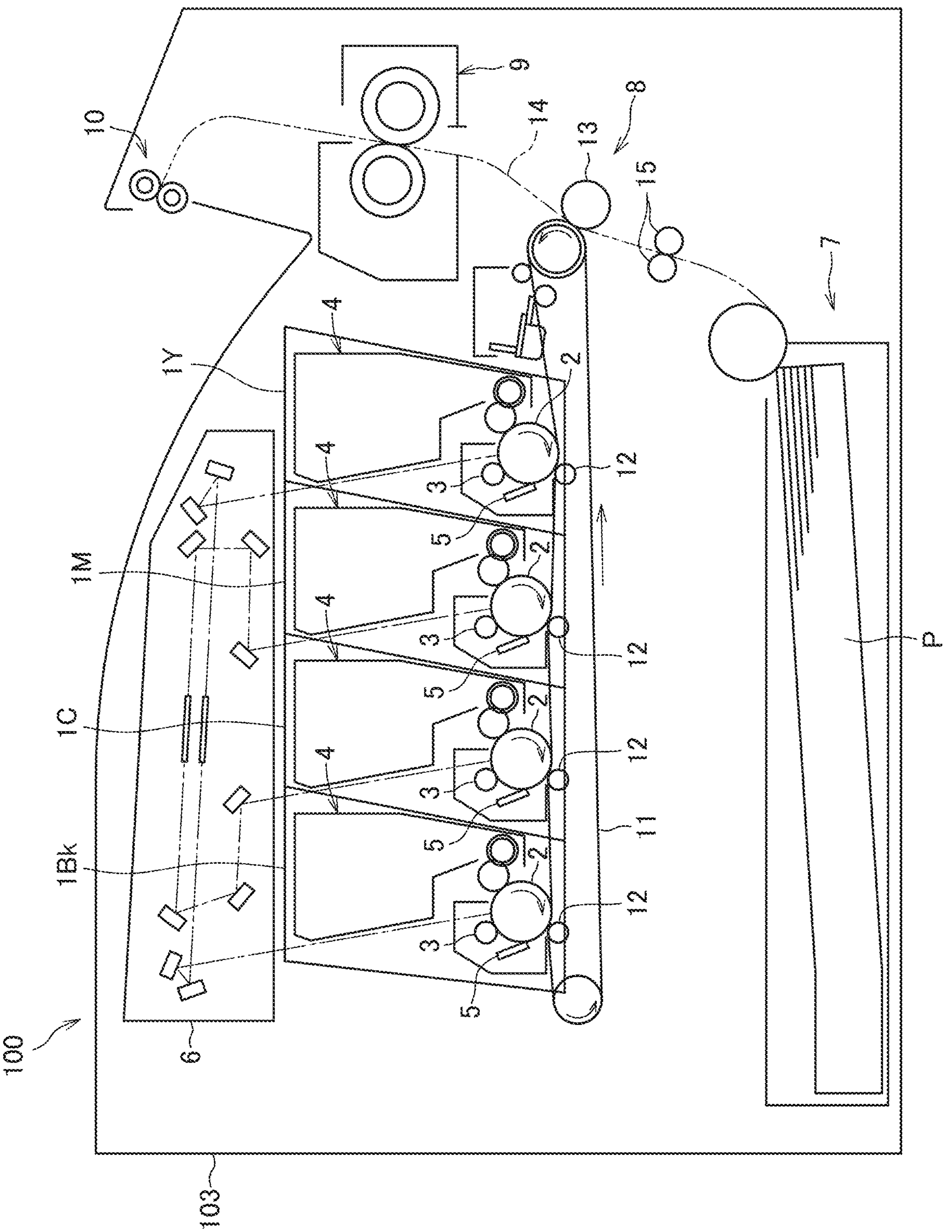
FIG. 1 is a schematic diagram illustrating a configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise. Identical reference numerals are assigned to identical components or equivalents and a description of those components is simplified or omitted. Hereinafter, a fixing device incorporated in an image forming apparatus is described as a heating device according to an embodiment of the present disclosure.

FIG. 1 is a schematic diagram illustrating a configuration of the image forming apparatus according to the embodiment of the present disclosure.

The image forming apparatus 100 illustrated in FIG. 1 includes four image forming units 1Y, 1M, 1C, and 1Bk detachably attached to an apparatus body thereof. The image forming units 1Y, 1M, 1C, and 1Bk have the same configuration except for containing different color developers, i.e., yellow (Y), magenta (M), cyan (C), and black (Bk) toners, respectively. The colors of the developers correspond to decomposed color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7, a transfer device 8, a fixing device 9, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk including photoconductors 2 and the charging devices 3, the exposure devices 6, the transfer device 8, and the like configures an image forming device that forms an image on the sheet P.

The transfer device 8 includes an intermediate transfer belt 11 having an endless form and serving as an intermediate transferor, four primary transfer rollers 12 serving as primary transferors, a secondary transfer roller 13 serving as a secondary transferor. The intermediate transfer belt 11 is stretched by a plurality of rollers. Each of the four primary transfer rollers 12 transfers the toner image on each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip therebetween. On the other hand, the secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Next, a description is given of a series of print operations of the image forming apparatus 100 with reference to FIG. 1.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from the terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip at each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. Thus, the full color toner image is transferred onto and borne on the sheet P. After the toner image is transferred from each of the photoconductors 2 onto the intermediate transfer belt 11, each of the cleaning devices 5 removes residual toner on each of the photoconductors 2.

After the full color toner image is transferred onto the sheet P, the sheet P is conveyed to the fixing device 9 to fix the toner image on the sheet P. Subsequently, the sheet ejection device 10 ejects the sheet P outside the image forming apparatus 100, and the series of print operations are completed.

Next, a configuration of the fixing device 9 is described.

Figure 2:
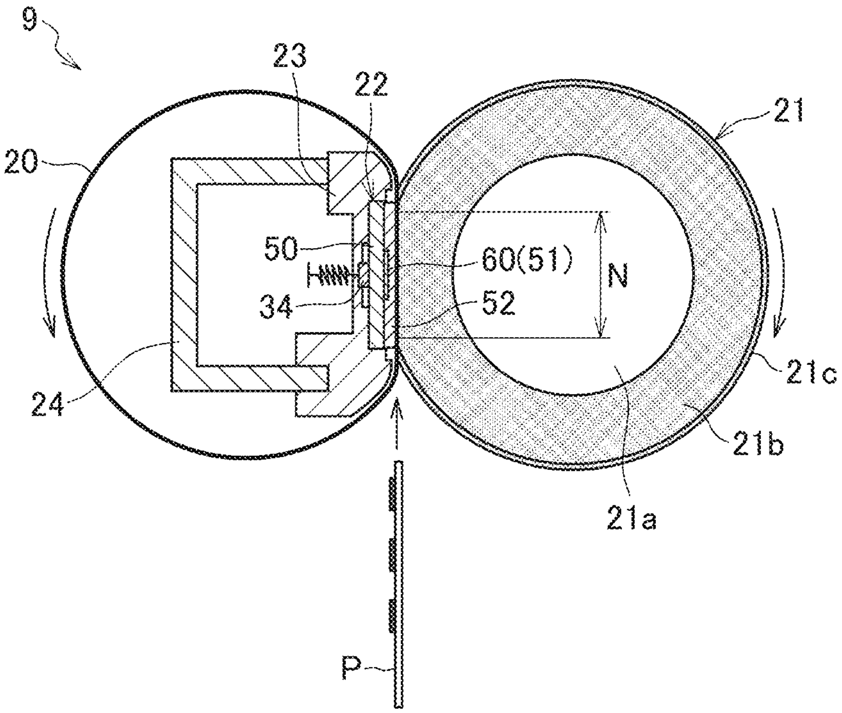
FIG. 2 is a schematic cross-sectional view of a main part of a fixing device incorporated in the image forming apparatus of FIG. 1.

As illustrated in FIG. 2, the fixing device 9 according to the present embodiment includes a fixing belt 20 as a rotator or a fixing member, a pressure roller 21 as an opposed rotator or a pressure rotator, a planar heater 22 as a heater, a heater holder 23 as a holder, a stay 24 as a support, a thermistor 34 as a temperature detector, and a thermostat as a power circuit breaker. The fixing belt 20 is an endless belt. The pressure roller 21 contacts the outer circumferential surface of the fixing belt 20 to form a fixing nip N as a nip. The heater holder 23 holds the heater 22. The stay 24 supports a back side of the heater holder 23 extending in a longitudinal direction. The thermistor 34 is in contact with the back side of the heater 22 and detects the temperature of the heater 22. The fixing device 9, the fixing belt 20, the pressure roller 21, the heater 22, the heater holder 23, and the stay 24 extend in a direction perpendicular to the sheet surface of FIG. 2 and a direction indicated by two-headed arrow in FIG. 3. Hereinafter, the direction is simply referred to as the longitudinal direction. Note that the longitudinal direction is also a width direction of the sheet P conveyed, a belt width direction of the fixing belt 20, and an axial direction of the pressure roller 21.

The fixing belt 20 includes, for example, a tubular base 20*b* (a base layer 20*b*) made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 μm to 50 μm to enhance durability of the fixing belt 20 and facilitate separation of the sheet P and a foreign substance from the fixing belt 20. An elastic layer made of rubber having a thickness of from 50 to 500 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or polytetrafluoroethylene (PTFE) as a slide layer.

The pressure roller 21 having, for example, an outer diameter of 25 mm, includes a solid iron core 21*a*, an elastic layer 21*b* on the surface of the core 21*a*, and a release layer 21*c* formed on the outside of the elastic layer 21*b*. The elastic layer 21*b* is made of silicone rubber and has a thickness of 3.5 mm, for example. Preferably, the release layer 21*c* is formed by a fluororesin layer having, for example, a thickness of approximately 40 μm on the surface of the elastic layer 21*b* to improve releasability.

The release layer 21*c* of the pressure roller 21 is a conductive layer made of perfluoroalkoxy alkane (PFA) with a conductive filler such as carbon. The outer peripheral surface (that is, an outer surface) of the release layer 21*c* (that is a surface layer) forms the outer surface of the pressure roller 21.

The heater 22 is disposed to contact the inner circumferential surface of the fixing belt 20. The heater 22 in the present embodiment contacts the pressure roller 21 via the fixing belt 20 and serves as a nip formation pad to form the fixing nip N between the pressure roller 21 and the fixing belt 20. The fixing belt 20 is a heated member heated by the heater 22.

The heater 22 may not contact the fixing belt 20 or may contact the fixing belt 20 indirectly via, e.g., a low-friction sheet. When the heater 22 is brought into direct contact with the fixing belt 20, the heat transfer efficiency to the fixing belt 20 is improved.

The heater 22 includes a base 50, a conductor layer 51 including a resistive heat generator 60, and an insulation layer 52.

The heater holder 23 and the stay 24 are disposed inside a loop of the fixing belt 20. The stay 24 is configured by a channeled metallic member, and both side plates of the fixing device 9 support both end portions of the stay 24. The stay 24 supports a stay side face of the heater holder 23. The stay side face faces the stay 24 and is opposite a heater side face of the heater holder 23. The heater side face faces the heater 22. Accordingly, the stay 24 retains the heater 22 and the heater holder 23 to be immune from being bent substantially by pressure from the pressure roller 21. Thus, the fixing nip N is stably formed between the fixing belt 20 and the pressure roller 21.

Since the heater holder 23 is subject to temperature increase by heat from the heater 22, the heater holder 23 is preferably made of a heat resistant material. The heater holder 23 made of heat-resistant resin having low thermal conduction, such as a liquid crystal polymer (LCP) or polyether ether ketone (PEEK), reduces heat transfer from the heater 22 to the heater holder 23. Thus, the heater 22 can effectively heat the fixing belt 20.

A spring serving as a biasing member causes the fixing belt 20 and the pressure roller 21 to press against each other. Thus, the fixing nip N is formed between the fixing belt 20 and the pressure roller 21. As a driving force is transmitted to the pressure roller 21 from a driver disposed in the image forming apparatus 100 (see FIG. 1), the pressure roller 21 serves as a drive roller that drives and rotates the fixing belt 20. The fixing belt 20 is thus driven and rotated by the pressure roller 21 as the pressure roller 21 rotates. When the fixing belt rotates, the fixing belt 20 slides on the heater 22. In order to facilitate sliding performance of the fixing belt 20, a lubricant such as oil or grease may be interposed between the heater 22 and the fixing belt 20.

When printing starts, the driver drives and rotates the pressure roller 21, and the fixing belt 20 starts rotation in accordance with rotation of the pressure roller 21. Additionally, as power is supplied to the heater 22, the heater 22 heats the fixing belt 20. When the temperature of the fixing belt 20 reaches a predetermined target temperature called a fixing temperature, as illustrated in FIG. 2, the sheet P bearing an unfixed toner image is conveyed in a direction indicated by arrow A in FIG. 2 (a sheet conveyance direction) and enters the fixing nip N between the fixing belt 20 and the pressure roller 21. Thus, the unfixed toner image on the sheet P is heated and pressed onto the sheet P and fixed onto the sheet P in the fixing nip N.

Figure 3:
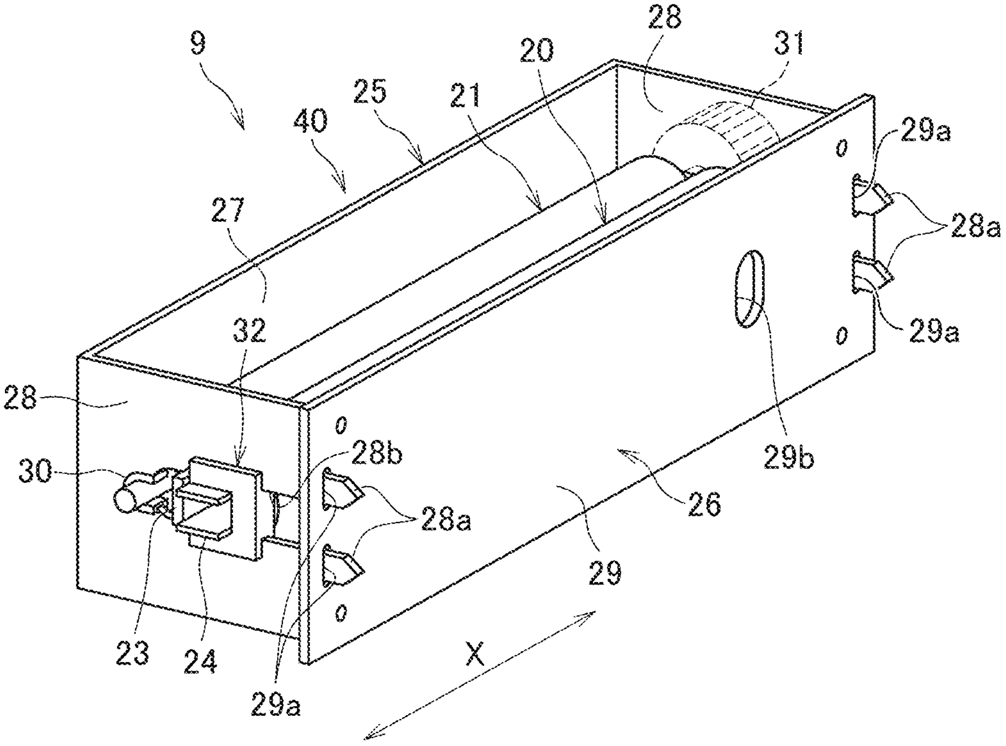
FIG. 3 is a perspective view of the fixing device of FIG. 2.
Figure 4:
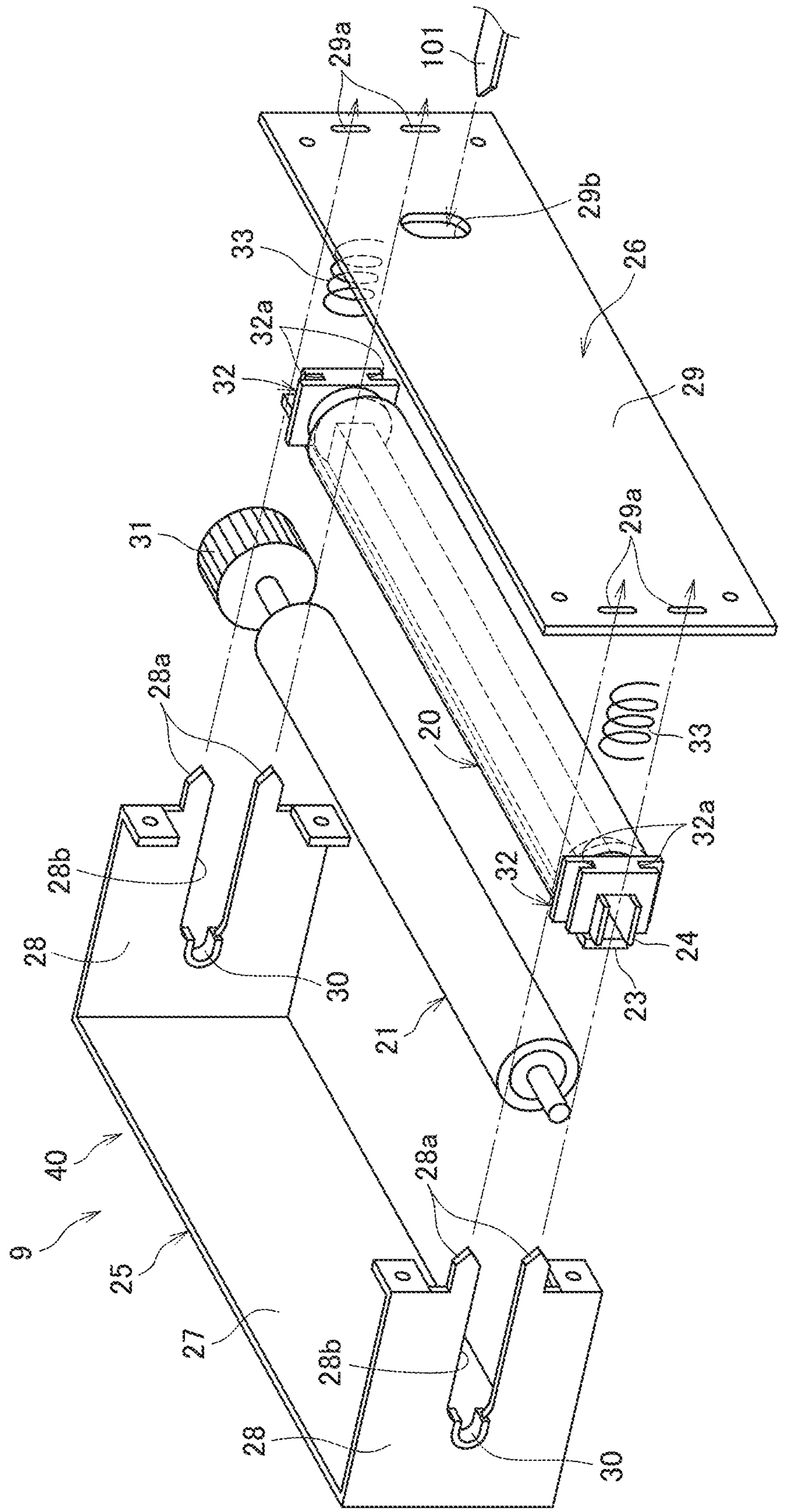
FIG. 4 is an exploded perspective view of the fixing device of FIG. 2.

FIG. 3 is a perspective view of the fixing device 9. FIG. 4 is an exploded perspective view of the fixing device 9.

As illustrated in FIGS. 3 and 4, the fixing device 9 includes a fixing device frame 40 as a heating device frame that includes a first device frame 25 and a second device frame 26. The first device frame 25 includes a pair of side walls 28 as side plates and a front wall 27. The second device frame 26 includes a rear wall 29. One of the pair of side walls 28 is disposed at one end of the fixing belt 20 in the width direction of the fixing belt 20, and the other one of the pair of side walls 28 is disposed at the other end of the fixing belt 20 in the width direction. The side walls 28 support the pressure roller 21 and flanges 32 disposed at both ends of the fixing belt 20. Each side wall 28 has a plurality of engagement projections 28*a*. As the engagement projections 28*a* engage corresponding coupling holes 29*a* in the rear wall 29, the first device frame 25 is coupled to the second device frame 26.

Each of the side walls 28 includes an insertion slot 28*b* through which a rotation shaft and the like of the pressure roller 21 are inserted. The insertion slot 28*b* opens toward the rear wall 29 and closes at a portion opposite the rear wall 29, and the portion of the insertion slot 28*b* opposite the rear wall 29 serves as a contact portion. A bearing 30 is disposed at an end of the contact portion to support the rotation shaft of the pressure roller 21. As both sides of the rotation shaft of the pressure roller 21 are attached to the corresponding bearings 30, the side walls 28 rotatably support the pressure roller 21.

A driving force transmission gear 31 serving as a drive transmitter is disposed at one side of the rotation shaft of the pressure roller 21 in an axial direction thereof. In a state in which the side walls 28 support the pressure roller 21, the driving force transmission gear 31 is exposed outside the side wall 28. Accordingly, when the fixing device 9 is installed in the body of the image forming apparatus 100 (see FIG. 1), the driving force transmission gear 31 is coupled to a gear disposed inside the image forming apparatus 100 so that the driving force transmission gear 31 transmits the driving force from the driver to the pressure roller 21. Alternatively, the driving force transmitter to transmit the driving force to the pressure roller 21 may be pulleys over which a driving force transmission belt is stretched taut, a coupler, and the like instead of the driving force transmission gear 31.

A pair of flanges 32 as end holders that support the fixing belt 20 and the like is disposed at both sides of the fixing belt 20 in the longitudinal direction thereof, respectively. The flange 32 is a part of the fixing device frame 40 of the fixing device 9. The flanges 32 support the fixing belt 20 in a state in which the fixing belt 20 is not basically applied with tension in a circumferential direction thereof while the fixing belt 20 does not rotate, that is, by a free belt system. Each flange 32 has a guide groove 32*a*. As edges of the insertion slot 28*b* of the side wall 28 enter the guide grooves 32*a*, respectively, the flange 32 is attached to the side wall 28.

A pair of springs 33 serving as a pair of biasing members is interposed between the rear wall 29 and each of the flanges 32. As the springs 33 bias the flanges 32 and the stay 24 toward the pressure roller 21, respectively, the fixing belt 20 is pressed against the pressure roller 21 to form the fixing nip between the fixing belt 20 and the pressure roller 21.

As illustrated in FIG. 4, a hole 29*b* as a positioner is disposed near one end of the rear wall 29 of the second device frame 26 in a longitudinal direction of the second device frame 26. The hole 29*b* is a positioner to position the body of the fixing device 9 with respect to the image forming apparatus 100. Similarly, the image forming apparatus 100 includes a projection 101 as a positioner. When the body of the fixing device 9 is installed in the image forming apparatus 100, a projection 101 is inserted into the hole 29*b* of the fixing device 9. Accordingly, the projection 101 engages the hole 29*b*, positioning the body of the fixing device 9 with respect to the image forming apparatus 100 in a longitudinal direction of the fixing device 9. Although the hole 29*b* serving as the positioner is disposed near one end of the rear wall 29 in the longitudinal direction of the second device frame 26, a positioner is not disposed near another end of the rear wall 29. Thus, the second device frame 26 does not restrict thermal expansion and shrinkage of the body of the fixing device 9 in the longitudinal direction thereof due to temperature change.

Figure 5:
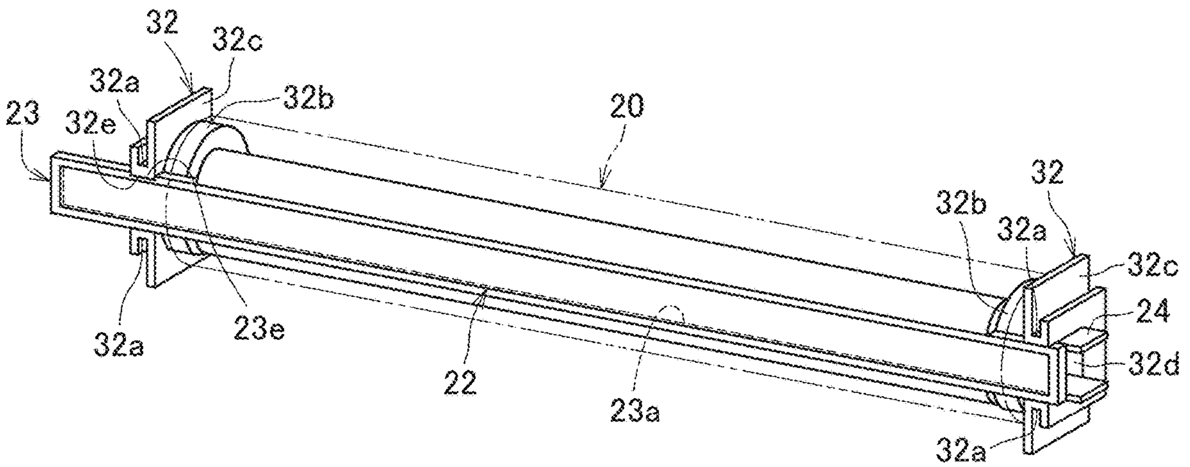
Figure 6:
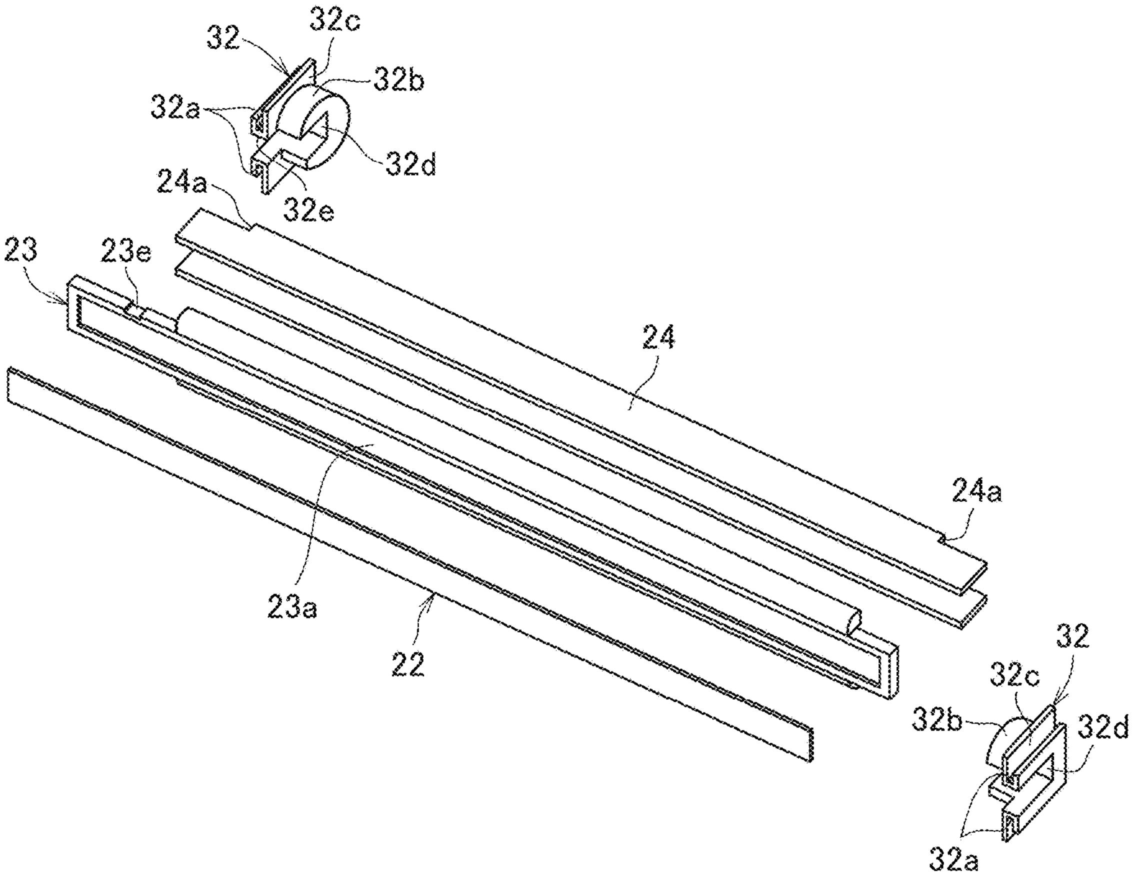
FIG. 6 is an exploded perspective view of the heater unit of FIG. 5.

FIG. 5 is a perspective view of a heater unit including the heater 22, the heater holder 23, and the flanges 32, and FIG. 6 is an exploded perspective view of the heater unit. In FIGS. 5 and 6, the shape of the heater holder 23 is simplified for the sake of convenience, and a specific shape thereof is described below.

As illustrated in FIGS. 5 and 6, the heater holder 23 has a rectangular accommodating recess 23*a* facing the fixing belt 20 and the fixing nip N to accommodate the heater 22. In other words, the accommodating recess 23*a* is in the heater side face of the heater holder 23 that faces the fixing belt 20 and the fixing nip N. A connector described below sandwiches the heater 22 and the heater holder 23 in a state in which the accommodating recess 23*a* accommodates the heater 22, thus holding the heater 22.

In addition to the guide grooves 32*a* described above, each of the pair of flanges 32 includes a belt support 32*b*, a belt restrictor 32*c*, and a supporting recess 32*d*. The belt support 32*b* is C-shaped and inserted into the loop of the fixing belt 20, thus contacting the inner circumferential surface of the fixing belt 20 to support the fixing belt 20. The belt restrictor 32*c* has a flange shape and contacts an edge face of the fixing belt 20 to restrict motion (e.g., skew) of the fixing belt 20 in the longitudinal direction of the fixing belt 20. One ends of the heater holder 23 and the stay 24 are inserted into the supporting recess 32*d* of one of the flanges 32, and the other ends of the heater holder 23 and the stay 24 are inserted into the supporting recess 32*d* of the other one of the flanges 32. As a result, the flanges 32 support the heater holder 23 and the stay 24.

As illustrated in FIGS. 5 and 6, the heater holder 23 includes a positioning recess 23*e* as a positioner disposed near one end of the heater holder 23 in the longitudinal direction thereof. The flange 32 further includes an engagement 32*e* illustrated in a left part in FIGS. and 6. The engagement 32*e* engages the positioning recess 23*e*, positioning the heater holder 23 with respect to the flange 32 in the longitudinal direction. The flange 32 illustrated in a right part in FIGS. 5 and 6 does not include the engagement 32*e* and therefore the heater holder 23 is not positioned with respect to the flange 32 in the longitudinal direction of the heater holder 23. Thus, the flange 32 does not restrict thermal expansion and shrinkage of the heater holder 23 in the longitudinal direction thereof due to temperature change.

As illustrated in FIG. 4, as the guide grooves 32*a* of the flanges 32 move along the insertion slots 28*b* of the side walls 28, the flanges 32 is attached to the side walls 28 disposed at lateral ends of the fixing device frame 40 in a longitudinal direction thereof. The flange 32, situated at a rear position in FIG. 4, of the two flanges 32 illustrated in FIG. 4 positions the heater holder 23 in the longitudinal direction thereof. As the flange 32 situated at the rear position in FIG. 4 is attached to the side wall 28, the heater holder 23 is positioned with respect to the side wall 28 in the longitudinal direction of the heater holder 23. Thus, the side wall 28 and the flange 32 serve as positioners that position the heater holder 23 with respect to the body of the fixing device 9 in the longitudinal direction of the heater holder 23.

The stay 24 is not positioned with respect to the flange 32 in the longitudinal direction of the stay 24. As illustrated in FIG. 6, the stay 24 includes steps 24*a* disposed at both lateral ends of the stay 24 in the longitudinal direction thereof, respectively. The steps 24*a* restrict motion (e.g., dropping) of the stay 24 with respect to the flanges 32, respectively, in the longitudinal direction of the stay 24. A gap is provided between the step 24*a* and at least one of the flanges 32 in the longitudinal direction of the stay 24. For example, the stay 24 is attached to the flanges 32 such that looseness is provided between the stay 24 and each of the flanges 32 in the longitudinal direction of the stay 24 so that the flanges 32 do not restrict thermal expansion and shrinkage of the stay 24 in the longitudinal direction thereof due to temperature change. That is, the stay 24 is not positioned with respect to one of the flanges 32.

Figure 7:
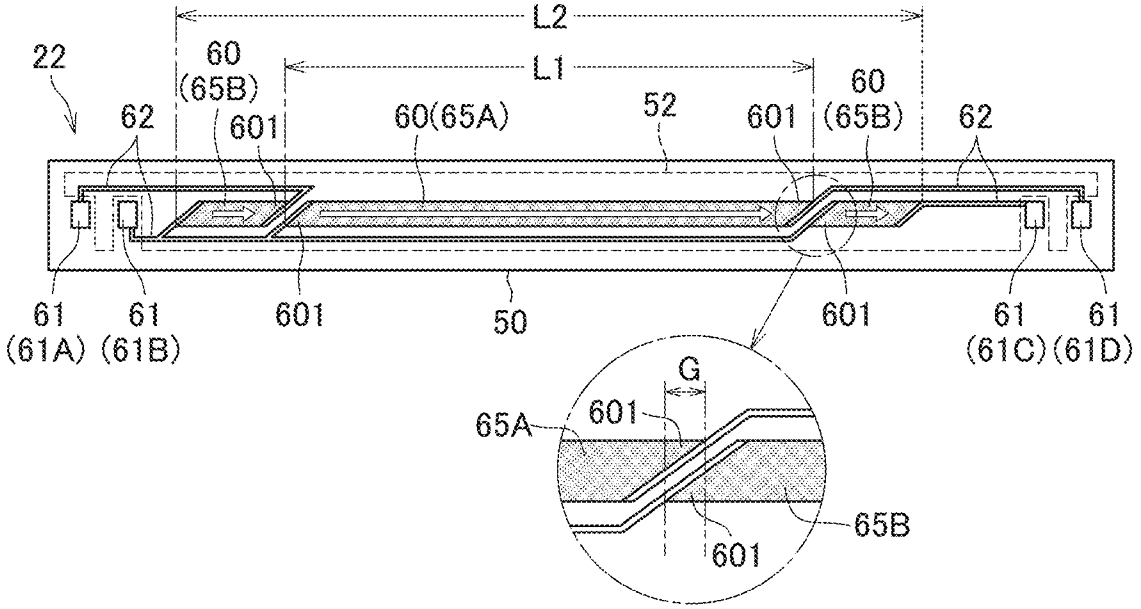
FIG. 7 is a plan view of a heater according to an embodiment of the present disclosure.
Figure 8:
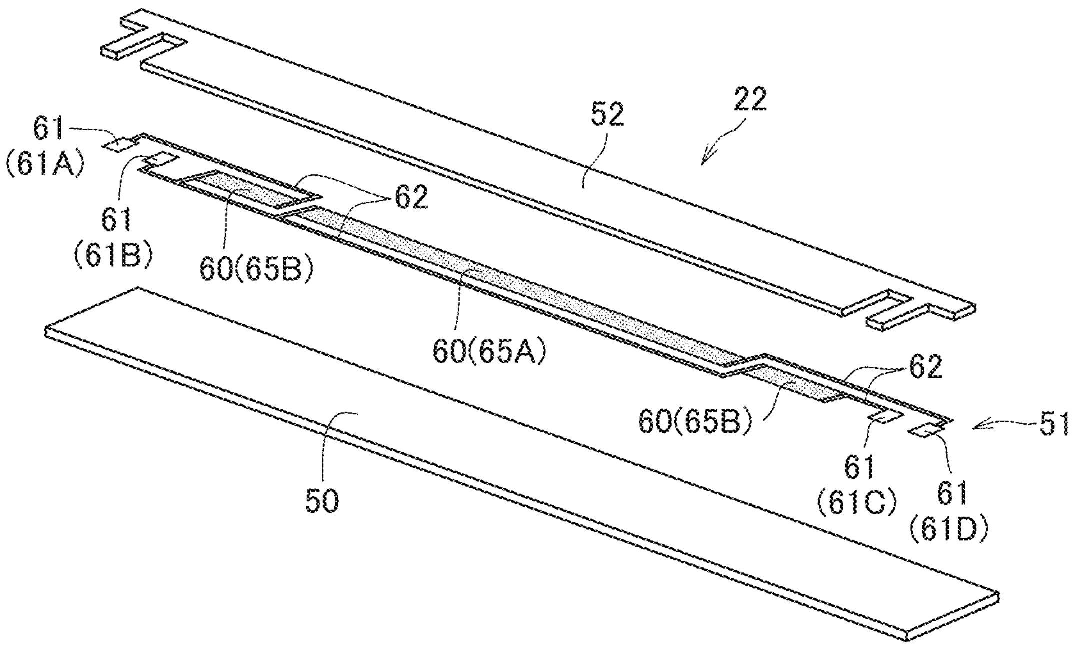
FIG. 8 is an exploded perspective view of the heater of FIG. 7.

FIG. 7 is a plan view of the heater 22. FIG. 8 is an exploded perspective view of the heater 22. Hereinafter, a front side of the heater 22 defines a side that faces the fixing belt 20 and the fixing nip N. A back side of the heater 22 defines a side that faces the heater holder 23.

As illustrated in FIG. 8, the conductor layer 51 includes a planar resistive heat generator 60, a plurality of electrodes 61 disposed at both ends of the base 50, and a plurality of power supply lines 62 each of which couples the electrode 61 to the resistive heat generator 60. As illustrated in FIG. 7, at least a part of each of the electrodes 61 is not coated by the insulation layer 52 and is exposed so that the electrodes 61 are coupled to the connector described below.

The base 50 is made of an insulating material such as glass or ceramic such as alumina or alumina nitride. Alternatively, the base 50 may be made of metal such as steel use stainless (SUS), iron, copper, or aluminum, and an insulation layer may be disposed between the base 50 and the conductor layer 51 to surely insulate the conductor layer 51.

Since metal has an enhanced durability against rapid heating and is easy to process, metal is preferably used to reduce manufacturing costs. Among metals, aluminum and copper are preferable because aluminum and copper have high thermal conductivity and are less likely to cause uneven temperature. Stainless steel is advantageous because stainless steel is manufactured at reduced costs compared to aluminum and copper.

The insulation layer 52 is made of heat-resistant glass. Alternatively, ceramic, polyimide (PI) or the like may be used as the material of the insulation layer 52.

The resistive heat generator 60 is produced by, for example, mixing silver-palladium (AgPd), glass powder, and the like into a paste. The paste is coated on the base 50 by screen printing or the like. Thereafter, the base 50 is fired to form the resistive heat generator 60. Alternatively, the resistive heat generator 60 may be made of a resistive material such as a silver alloy (AgPt) and ruthenium oxide ($RuO_2$).

The power supply lines 62 are made of conductors having an electrical resistance value smaller than the electrical resistance value of the resistive heat generator 60. Silver (Ag), silver palladium (AgPd) or the like may be used as a material of the power supply lines 62 and the electrodes 61. Screen-printing such a material forms the power supply lines 62 and the electrodes 61.

Although the resistive heat generator 60 are disposed on the front side of the base 50 in the present embodiment, alternatively, the resistive heat generator 60 may be disposed on the back side of the base 50. In this case, since the heat of the resistive heat generator 60 is transmitted to the fixing belt 20 through the base 50, it is preferable that the base 50 be made of a material with high thermal conductivity such as aluminum nitride. Making the base 50 with the material having high thermal conductivity enables to sufficiently heat the fixing belt even if the resistive heat generator 60 is disposed on the back side of the base 50.

According to the present embodiment, the resistive heat generator 60, the electrodes 61, and the power supply lines 62 are made of an alloy of silver, palladium, or the like to attain a positive temperature coefficient (PTC) property, that is, to have a positive temperature coefficient of resistance. The PTC characteristic is a characteristic in which the resistance value increases as the temperature increases, for example, a heater output decreases under a constant voltage.

The resistive heat generator 60 having the PTC property quickly starts heat generation with an increased output at low temperatures and prevents overheating because high temperatures decrease output. For example, if a temperature coefficient of resistance (TCR) of the PTC property is in a range of from about 300 ppm/° C. to about 4,000 ppm/° C., the heater 22 is manufactured at reduced costs while retaining a resistance value needed for the heater 22.

The TCR is preferably in a range of from about 500 ppm/° C. to about 2,000 ppm/° C. The TCR is calculated by measuring the resistance value at 25° C. and 125° C. For example, if the temperature increases by 100° C. and the resistance value increases by 10%, the TCR is 1,000 ppm/° C.

According to the present embodiment, the resistive heat generator 60 includes three resistive heat generators arranged in a longitudinal direction of the base 50. One of the three resistive heat generators is a central heat generator 65A as a first heat generator disposed at the center of the base 50 in the longitudinal direction, and the remaining two resistive heat generators are end heat generators 65B as second heat generators disposed adjacent to both ends of the central heat generator 65A in the longitudinal direction. The central heat generator 65A and the end heat generators 65B are configured to be independently controlled with respect to heat generation.

The plurality of electrodes 61 are referred to as a first electrode 61A, a second electrode 61B, a third electrode 61C, and a fourth electrode 61D in order from the left side in FIG. 7. Applying a voltage to the second electrode 61B and the fourth electrode 61D causes the central heat generator 65A to generate heat. Applying a voltage to the first electrode 61A and the second electrode 61B causes the left end heat generator 65B in FIG. 7 to generate heat, and applying a voltage to the second electrode 61B and the third electrode 61C causes the right end heat generator 65B in FIG. 7 to generate heat.

In addition, the first electrode 61A and the third electrode 61C are coupled in parallel outside the heater 22 and configured to be able to apply the voltage at the same time. Applying the voltage between the second electrode 61B and each of the first electrode 61A and the third electrode 61C enables both end heat generators 65B to generate heat at the same time. Each of Arrows in FIG. 7 indicates a direction of current flowing in the longitudinal direction of each of the heat generators 65A and 65B.

When a width of the sheet passing through the fixing device 9 is equal to or shorter than the width L1 of the central heat generator 65A, the central heat generator 65A generates heat. When the width of the sheet passing through the fixing device 9 is longer than the width L1 of the central heat generator 65A, the end heat generators 65B generate heat in addition to the central heat generator 65A. As a result, the heater 22 can generate heat in a heat generation area corresponding to a size of a sheet conveyance area. Additionally, the width L1 of the central heat generator 65A is set to a width of a small sheet (for example, a width corresponding to A4 sheet: 215 mm). The width L2 of the heat generation area from one end heat generator 65B to the other end heat generator 65B is set to a width of a large sheet (for example, a width corresponding to A3 sheet: 301 mm). In the above-described configuration, turning off the end heat generators 65B prevents an excessive temperature rise in a non-sheet conveyance portion caused by many small sheets P passing through the fixing device. The above-described configuration can improve the productivity of printing because the above-described configuration does not need to reduce a print speed to prevent the excessive temperature rise.

As illustrated in FIG. 7, each of the central heat generator 65A and the end heat generators 65B in the present embodiment has inclined portions 601 that are inclined with respect to a sheet passing direction that is the vertical direction in FIG. 7 and disposed at both ends of each of the central heat generator 65A and the end heat generators 65B. The inclined portions 601 adjacent to each other at least partially overlap each other in the longitudinal direction of the heater 22 (that is the lateral direction in FIG. 7) and are disposed in the same region G (see the enlarged view in FIG. 7) in the longitudinal direction. Disposing the inclined portions 601 so as to overlap each other as described above reduces a temperature drop between the central heat generator 65A and the end heat generator 65B and reduces fixing unevenness in the width direction of the sheet.

Figure 9:
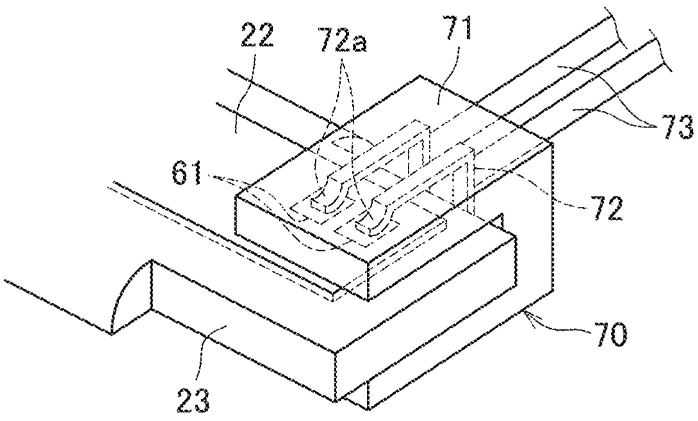
FIG. 9 is a perspective view of a connector attached to the heater of FIG. 7 and a heater holder.

FIG. 9 is a perspective view of a connector 70 attached to the heater 22 and the heater holder 23.

As illustrated in FIG. 9, the connector 70 includes a housing 71 made of resin and a contact terminal 72 that is a flat spring anchored to the housing 71. The contact terminal 72 includes a pair of contacts 72*a* that contacts the electrodes 61 of the heater 22, respectively. The contact terminal 72 of the connector 70 is coupled to a harness 73 that supplies power.

As illustrated in FIG. 9, the connector 70 is attached to the heater 22 and the heater holder 23 such that the connector 70 sandwiches the heater 22 and the heater holder 23 together at the front side and the back side, respectively. Thus, the contacts 72*a* of the contact terminal 72 elastically contact and press against the electrodes 61 of the heater 22, and the resistive heat generator 60 is electrically coupled to a power supply provided in the image forming apparatus via the connector 70 and is powered by the power supply.

Since the connector 70 serving as a power supply member also functions as a clamping member that clamps and holds the heater 22 and the heater holder 23 together, the fixing device 9 in the present embodiment does not need to have another clamping member. As a result, the number of components can be reduced. Note that the connector 70 is similarly attached to the other end of the heater 22 opposite to the end of the heater 22 illustrated in FIG. 9.

In the above-described fixing device 9, the surface of the pressure roller 21 illustrated in FIG. 2 may be charged. The surface of the pressure roller 21 charged to the same polarity as that of the toner repels the toner on the sheet P near the fixing nip N, and the toner adheres to the fixing belt 20. As a result, the toner adheres to the fixing belt 20 to cause fixing failure. In addition, the fixing belt 20 to which the toner adheres rotates, and the toner on the fixing belt 20 reaches the fixing nip N again and is attached to the sheet P again. Thus, an abnormal image due to electrostatic offset occurs.

To prevent the pressure roller 21 from charging, for example, a discharger may be brought into contact with the core 21*a* of the pressure roller 21. The discharger removes the charge on the outer peripheral surface of the pressure roller 21 from the release layer 21*c* to the core 21*a* via the conductive elastic layer 21*b* to prevent the fixing failure and the electrostatic offset.

However, the above-described configuration needs the elastic layer 21*b* having conductivity. A method of making the elastic layer 21*b* having conductivity is, for example, mixing a conductive filler into the silicone rubber of the elastic layer 21*b*. However, this method impairs the elasticity and expansibility of the elastic layer 21*b*, which reduces the width of the fixing nip N. In order to secure a sufficient width of the fixing nip N, a load applied to the fixing belt 20 by the pressure roller 21 (hereinafter referred to as a fixing load) needs to be increased. Increase the fixing load increases frictional force generated between the fixing belt 20 and the pressure roller 21. As a result, the fixing belt 20 is likely to be worn and easily damaged. In particular, since a high-speed image forming apparatus prints a large number of sheets per job, charge in the pressure roller 21 of the fixing device 9 increases. In order to secure a sufficient discharge ability with respect to the pressure roller 21, increasing the amount of filler mixed in the silicone rubber to further reduce the electric resistance of the elastic layer 21*b* is needed, which increases the fixing load. Accordingly, the above-described configuration causes the problem of wear and breakage of the fixing belt 20.

As described above, the occurrence of the problem of wear and breakage of the fixing belt 20 in the above-described configuration causes difficulty in achieving both speed-up of the fixing device 9 and reduction of the electrostatic offset and the fixation failure.

Figure 10:
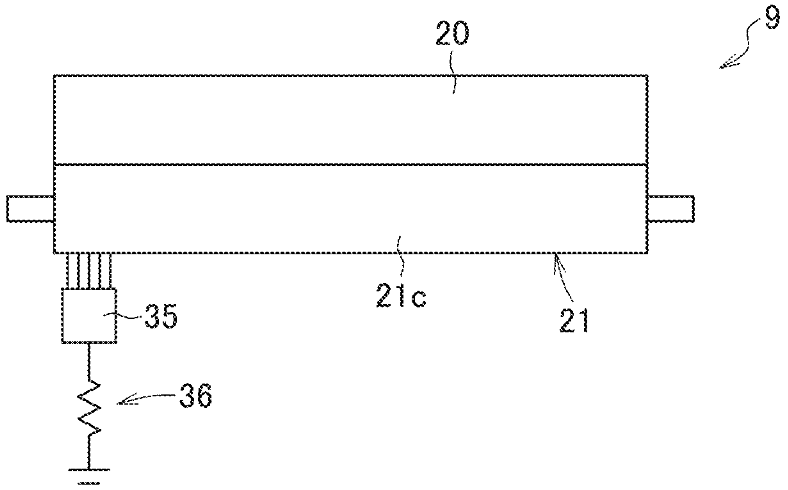
FIG. 10 is a schematic diagram illustrating a discharging brush in contact with a pressure roller.

To prevent the pressure roller 21 from charging, the fixing device 9 according to the present embodiment includes a discharging brush 35 as the discharger as illustrated in FIG. 10. The discharging brush 35 is in contact with the release layer 21*c* that is a surface layer of the pressure roller 21. The discharging brush 35 is grounded via a first resistor 36.

The discharging brush 35 can remove the charge on the surface layer of the pressure roller 21 to prevent the fixing failure and the electrostatic offset. In addition, since the discharging brush 35 is in contact with the release layer 21*c* of the pressure roller 21, the elastic layer 21*b* that is an intermediate layer does not need to be a conductive layer. Accordingly, the above-described configuration does not need to increase the fixing load in order to secure the width of the fixing nip N as described above and can achieve both speed-up of the fixing device 9 and reduction of the electrostatic offset and the fixation failure.

Figure 11A:
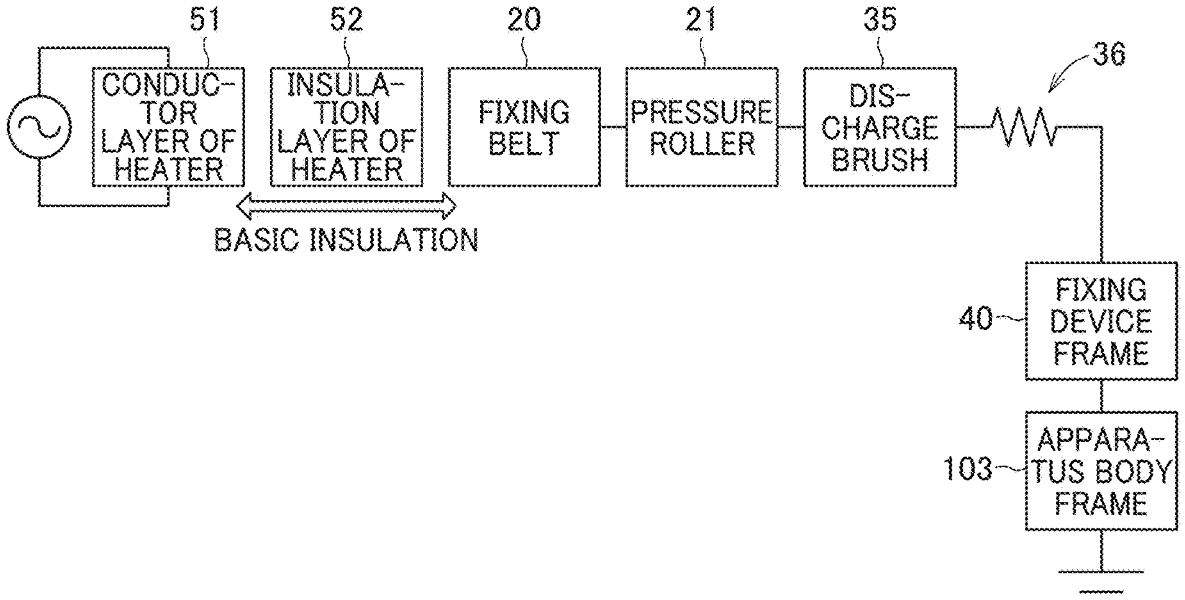
FIGS. 11A and 11B are brock diagrams illustrating a configuration to ground the surface layer of the pressure roller of FIG. 10.

In the fixing device 9 including the planar heater 22 in contact with the inner surface of the fixing belt 20 as in this embodiment, current from an AC power source leaks to a member outside the fixing device 9 via the pressure roller 21, which may adversely affect electronic components or cause components in the image forming apparatus to be charged and toner to adhere to the components. As illustrated in FIG. 11, the insulation layer 52 thinner than 0.1 mm basically insulates the fixing belt 20 from the conductor layer 51 of the heater 22 to which the AC voltage is applied. The fixing belt 20 is in contact with the pressure roller 21. The pressure roller 21 is in contact with the discharging brush 35. The discharging brush 35 is grounded via the first resistor 36, the fixing device frame 40, and an image forming apparatus main body frame 103 (hereinafter also simply referred to as an apparatus main body frame 103). In the above-described configuration, damage of the thin insulation layer 52 electrically couples the conductor layer 51 to the fixing belt 20 and the pressure roller 21, and current flows from the AC power source to the fixing device frame 40 and the apparatus main body frame 103. The above-described current flow may adversely affect electronic components or cause components in the image forming apparatus to be charged and toner to adhere to the components. The toner adhered to the components may stain the hand of the operator who performs jam processing or the like. In contrast, for example, a halogen heater as the heater used in the fixing device includes a filament that flows current, the filament is covered with a glass tube as the insulation layer. The thickness of wall of the glass tube is 0.4 mm or more enhances insulation between the halogen heater and the fixing belt 20. In addition, the halogen heater and the fixing belt 20 are not in contact with each other. Accordingly, the halogen heater is less likely to cause the above-described charging of components and the above-described adverse effects on electronic components.

The discharging brush 35 grounded via the first resistor 36 in the present embodiment solves the above-described disadvantage in the fixing device including the planar heater, that is, prevents the above-described charging of components and the above-described adverse effects on electronic components. The first resistor 36 reduces the current flowing to the ground via the fixing device frame 40 and the apparatus main body frame 103 to prevent the adverse effect on the electronic components in the image forming apparatus and the charging of the components. The first resistor 36 may be a resistor such as a general passive element or a conductive resin component as long as the first resistor 36 has a necessary resistance value.

In the present embodiment, the first resistor 36 is disposed between the discharging brush 35 and the fixing device frame 40 in a direction of the current flowing from the surface layer of the pressure roller 21 to the ground via the discharging brush 35. The above-described configuration can prevent the adverse effect on electronic components around the fixing device 9 (that is, the electronic components outside the fixing device 9 in the image forming apparatus). In addition, the above-described configuration can prevent members around the fixing device 9 from charging and, as a result, can effectively prevent toner from scattering and adhering to the outside of the fixing device 9.

The resistance value of the first resistor 36 is set to an appropriate value in order to set the current flowing to the ground to a desired value or less. Specifically, the preferable current value of the current flowing through the first resistor 36 is equal to or less than 3.5 mA that is defined by International Electrotechnical Commission Japanese Industrial Standard No. 6095-1 (IEC-J60950-1). A more preferable current value is 1.0 mA or less defined in Appended table 12 of Electrical Appliance and Material Safety Act regarding Article 7 (ii) of Ministerial Order to Provide Technical Standards for Electrical Appliances and Materials in Japan. The above-described current values are measured by an ammeter when the power supply applies a voltage to the first resistor 36.

The resistance value of the first resistor 36 is calculated by E1/I1, where E1 is the voltage [V] of the power supply in the image forming apparatus, and I1 is the current value [A] flowing through the first resistor 36. Specifically, the resistance value of the first resistor 36 is set to $(10/3.5)\times10^{4}\Omega$ or more by $(100/3.5\times10^{-3})$ in the case that the voltage E1 is 100 V, and the current I1 is the preferable current value 3.5 mA or less. Alternatively, the resistance value of the first resistor 36 may be set to $1\times10^{5}\Omega$ or more by $100/(1.0\times10^{-3})$ in the case that the voltage E1 is 100 V, and the current I1 is the more preferable current value 1.0 mA or less. Setting the resistance value of the first resistor 36 as described above means setting a combined resistance on a current path to $(10/3.5)\times10^{4}\Omega$ or more or $1\times10^{5}\Omega$ or more.

Figure 11B:
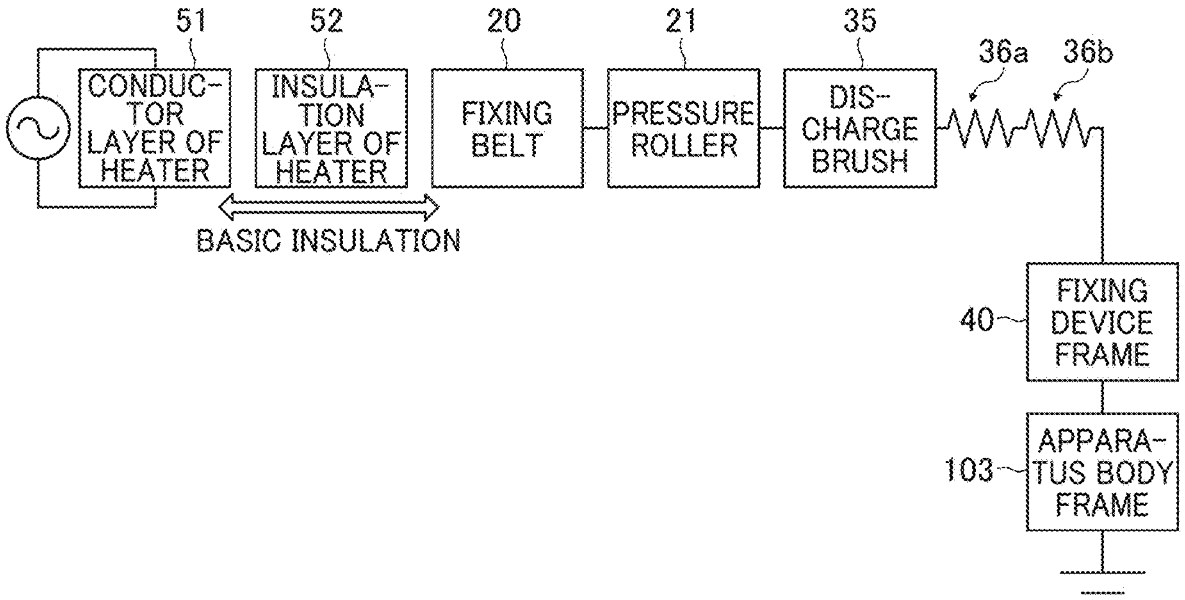

Preferably, a plurality of first resistors 36*a* and 36*b* are coupled in series between the discharging brush 35 and the fixing device frame 40 as illustrated in FIG. 11B. The above-described configuration improves the reliability of the fixing device because the above-described configuration can reduce the current flowing to the ground even if any of the first resistors 36*a* and 36*b* is damaged. In addition, the resistance value of each of the first resistors 36*a* and 36*b* is preferably set to the above-described value. Thus, even if any one of the first resistors 36*a* and 36*b* is damaged, the value of the current flowing through the first resistors 36*a* and 36*b* can be set to 3.5 mA or less or 1.0 mA or less.

Figure 12:
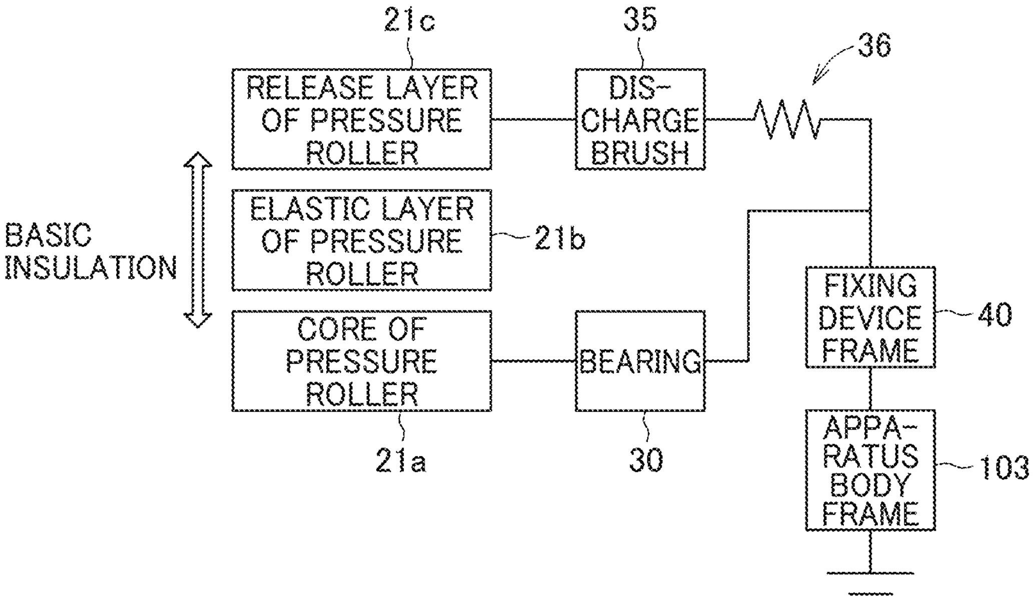
FIG. 12 is a brock diagram illustrating a configuration of insulation between a release layer and a cored bar in the pressure roller of FIG. 10.

As illustrated in FIG. 12, the elastic layer 21*b* that is the non-conductive intermediate layer insulates the release layer 21*c* in contact with the discharging brush 35 from the core 21*a* in the pressure roller 21.

Setting the thickness of the elastic layer 21*b* to 2.5 mm or more ensures the creepage distance between the release layer 21*c* and the core 21*a* (that is the distance between the axial end surface of the release layer 21*c* and the axial end surface of the core 21*a*) to be 2.5 mm or more and basically insulates the release layer 21*c* and the core 21*a* each other. The above-described configuration prevents a current from flowing from the release layer 21*c* to the core 21*a* and charging the core 21*a*.

However, setting the thickness of the elastic layer 21*b* to too large increases the difference in diameters of portions of the elastic layer 21*b* due to thermal expansions. The too thick elastic layer 21*b* increases a variation in a rotation speed of the pressure roller 21 and affects a rotation speed of the fixing belt 20 in the case that the rotation of the pressure roller 21 drives and rotates the fixing belt 20. In order to suppress the variation in the rotation speed due to thermal expansion, the elastic layer 21*b* is preferably set to 6.0 mm or less.

In consideration of the above-described basic insulation and the variation in the rotational speeds due to thermal expansion, the thickness of the elastic layer 21*b* is preferably set to 2.5 mm or more and 6.0 mm or less. In addition, the thickness of the elastic layer 21*b* and the fixing load is more preferably set so that the thickness of the elastic layer is larger than or equal to 2.5 mm in a pressure state that the pressure roller 21 is pressed against the fixing belt 20. Note that the pressure state is defined as a state in which the pressure roller 21 is pressed against the fixing belt 20 to fix the toner image onto the sheet. As a result, the base insulation can be secured more reliably.

Setting the thicknesses of the elastic layers 21*b* as described above enables freely designing the bearing 30. The above-described setting enables using a ball bearing as the bearing 30 which improves safety of the fixing device and lengthen the life of the fixing device. Without setting the thickness of the elastic layer 21*b* as described above, a non-conductive sliding bearing may be used as the bearing 30 as another method of preventing the current from flowing from the core 21*a* to the ground. However, the non-conductive sliding bearing as the bearing 30 is more likely to be worn than the ball bearing in a high-speed fixing device. Alternatively, an insulating member may be inserted between the fixing device frame 40 and the ball bearing. However, inserting the insulating member deteriorates the positional accuracy of the bearing 30 and the parallelism between the fixing belt 20 and the pressure roller 21, which causes meandering or wear of the fixing belt 20. Accordingly, setting the thicknesses of the elastic layers 21*b* as described above and using the ball bearing as the bearing 30 improves the safety of the fixing device and lengthen the life of the fixing device.

Figure 13:
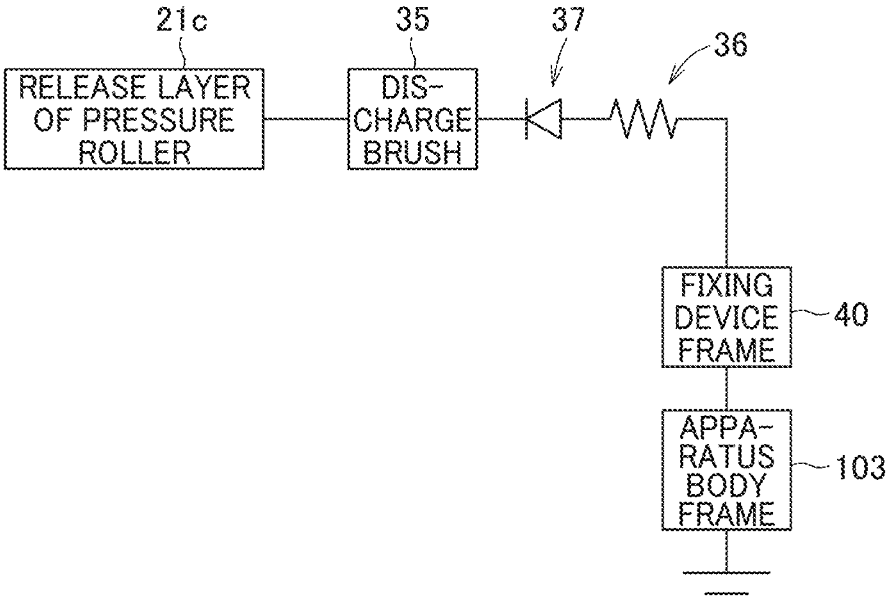
FIG. 13 is a brock diagram illustrating an embodiment in which a first diode is coupled to the pressure roller.

As illustrated in FIG. 13, a first diode 37 may be disposed as a first rectifier in the fixing device. The first diode 37 is coupled in series with the first resistor 36.

The first diode 37 charges the pressure roller 21 to a polarity opposite to the polarity of the toner (positive in the present embodiment), that is, charges the pressure roller 21 so as to attract the toner. The above-described configuration can prevent to toner from adhering to the fixing belt 20.

In the present embodiment, the first diode 37 is disposed between the discharging brush 35 and the fixing device frame 40 in the direction of the current flowing from the release layer 21*c* of the pressure roller 21 to the ground. In other words, the first diode 37 is disposed between the discharging brush 35 and the fixing device frame 40 in a path of the current flowing from the release layer 21*c* of the pressure roller 21 to the ground. The above-described configuration attracts toner to an upstream portion from the fixing device frame 40 in the direction of the current flowing from the pressure roller 21 to the ground. As a result, the above-described configuration limits charged components to a minimum range, prevents the adverse effect on electronic components outside the fixing device, and prevents toner from scattering and adhering to the components outside the fixing device.

Figure 14:
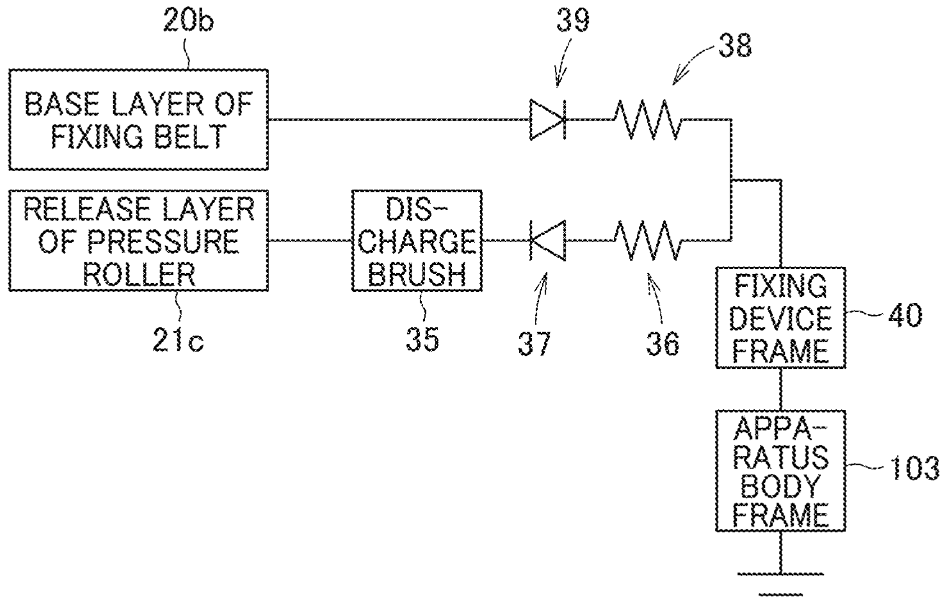
FIG. 14 is a brock diagram illustrating an embodiment in which a second diode is coupled to the fixing belt.

In addition, the base layer 20*b* of the fixing belt 20 may be made of conductive material, and the fixing belt 20 may be grounded via the base layer 20*b* as illustrated in FIG. 14. In the present embodiment, the base layer 20*b* of the fixing belt 20 is made of conductive polyimide.

Grounding the fixing belt 20 via the base layer 20*b* sets the potential of the fixing belt 20 to 0 V, which prevents the toner from adhering to the fixing belt 20.

In FIG. 14, the base layer 20*b* of the fixing belt 20 is grounded via a second diode 39 as a second rectifier, a second resistor 38, and the like. The second diode 39 and the second resistor 38 are coupled in series.

The fixing belt 20 is grounded via a second resistor 38. The second resistor 38 limits the current flowing from the base layer 20*b* of the fixing belt 20 to the ground and improves the safety of the fixing device. The second resistor 38 is disposed between the base layer 20*b* of the fixing belt 20 and the fixing device frame 40 in a direction of the current flowing from the base layer 20*b* of the fixing belt 20 to the ground.

The second diode 39 is set so that the direction in which current flows in the second diode 39 is opposite to the direction in which the current flows in the first diode 37. The second diode 39 charges the base layer 20*b* of the fixing belt 20 to the same polarity (negative in the present embodiment) as the toner, that is, charges the fixing belt so that the toner and fixing belt repel each other. The above-described configuration can prevent the toner from adhering to the fixing belt 20.

Figure 15:
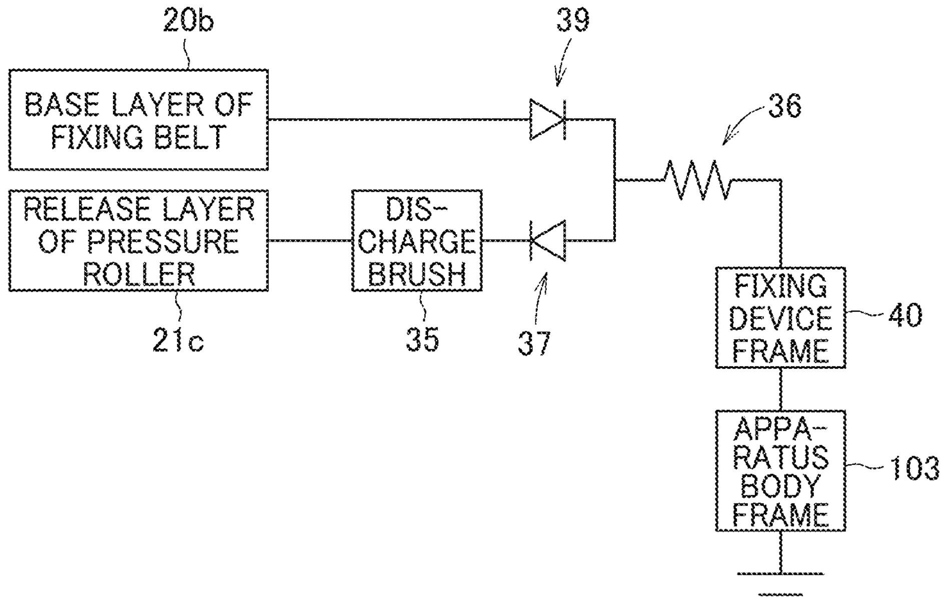
FIG. 15 is a brock diagram illustrating an embodiment in which the pressure roller and the fixing belt are grounded via a common first resistor.

In the above, the resistor coupled in series to the release layer 21*c* of the pressure roller 21 to ground the release layer 21*c* is different from the resistor coupled in series to the base layer 20*b* of the fixing belt 20 to ground the base layer 20*b*, but the release layer 21*c* and the base layer 20*b* may be grounded via a common resistor. For example, as illustrated in FIG. 15, the release layer 21*c* of the pressure roller 21 and the base layer 20*b* of the fixing belt may be grounded via the common first resistor 36. In other words, a path from the release layer 21*c* of the pressure roller 21 to the first diode 37 via the discharging brush 35 and a path from the base layer 20*b* of the fixing belt 20 to the second diode 39 are coupled in parallel to the first resistor 36 and grounded via the fixing device frame 40 and the apparatus main body frame 103. Coupling the release layer 21*c* of the pressure roller 21 and the base layer 20*b* of the fixing belt 20 to the common first resistor 36 reduces the number of components of the fixing device and the cost of the fixing device. In contrast, setting the first resistor 36 and the second resistor 38 separately as illustrated in FIG. 14 enables freely changing the resistance value of each path.

The above-described embodiments are illustrative and do not limit this disclosure. It is therefore to be understood that within the scope of the appended claims, numerous additional modifications and variations are possible to this disclosure otherwise than as specifically described herein.

The image forming apparatus according to the present embodiments of the present disclosure is applicable not only to a color image forming apparatus 100 illustrated in FIG. 1 but also to a monochrome image forming apparatus, a copier, a printer, a facsimile machine, or a multifunction peripheral including at least two functions of the copier, printer, and facsimile machine.

The sheets P serving as recording media may be thick paper, postcards, envelopes, plain paper, thin paper, coated paper, art paper, tracing paper, overhead projector (OHP) transparencies, plastic film, prepreg, copper foil, and the like.

Figure 16:
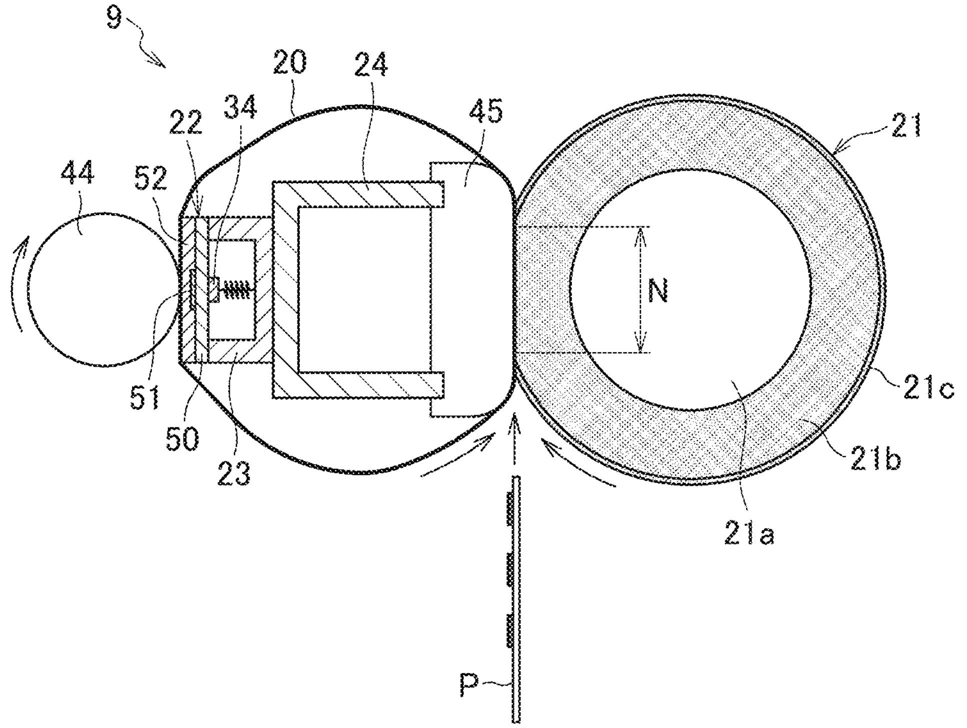
FIG. 16 is a schematic diagram illustrating a configuration of another fixing device.
Figure 17:
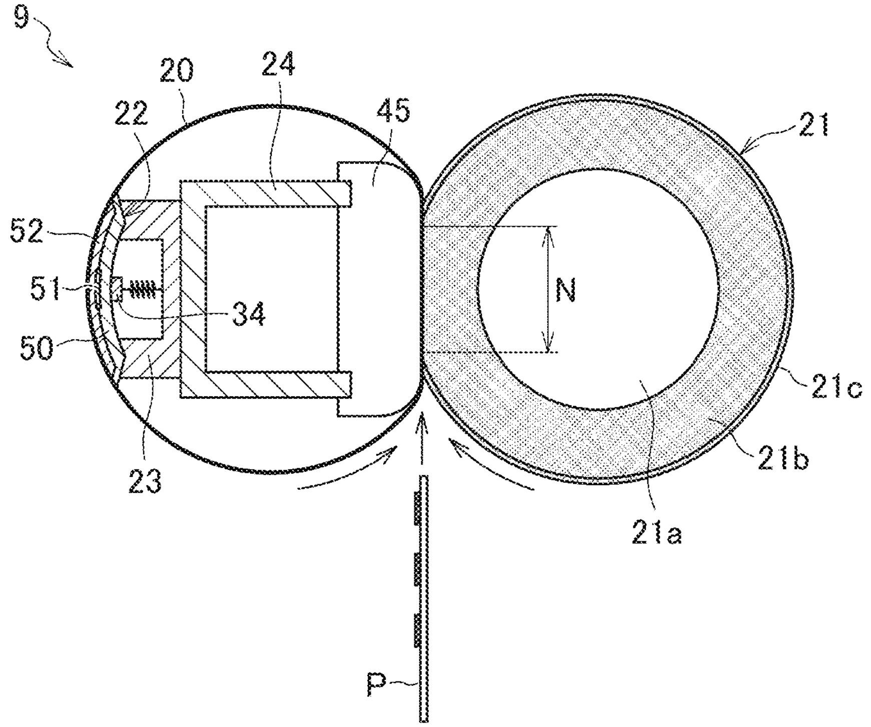
FIG. 17 is a schematic diagram illustrating a configuration of yet another fixing device.
Figure 18:
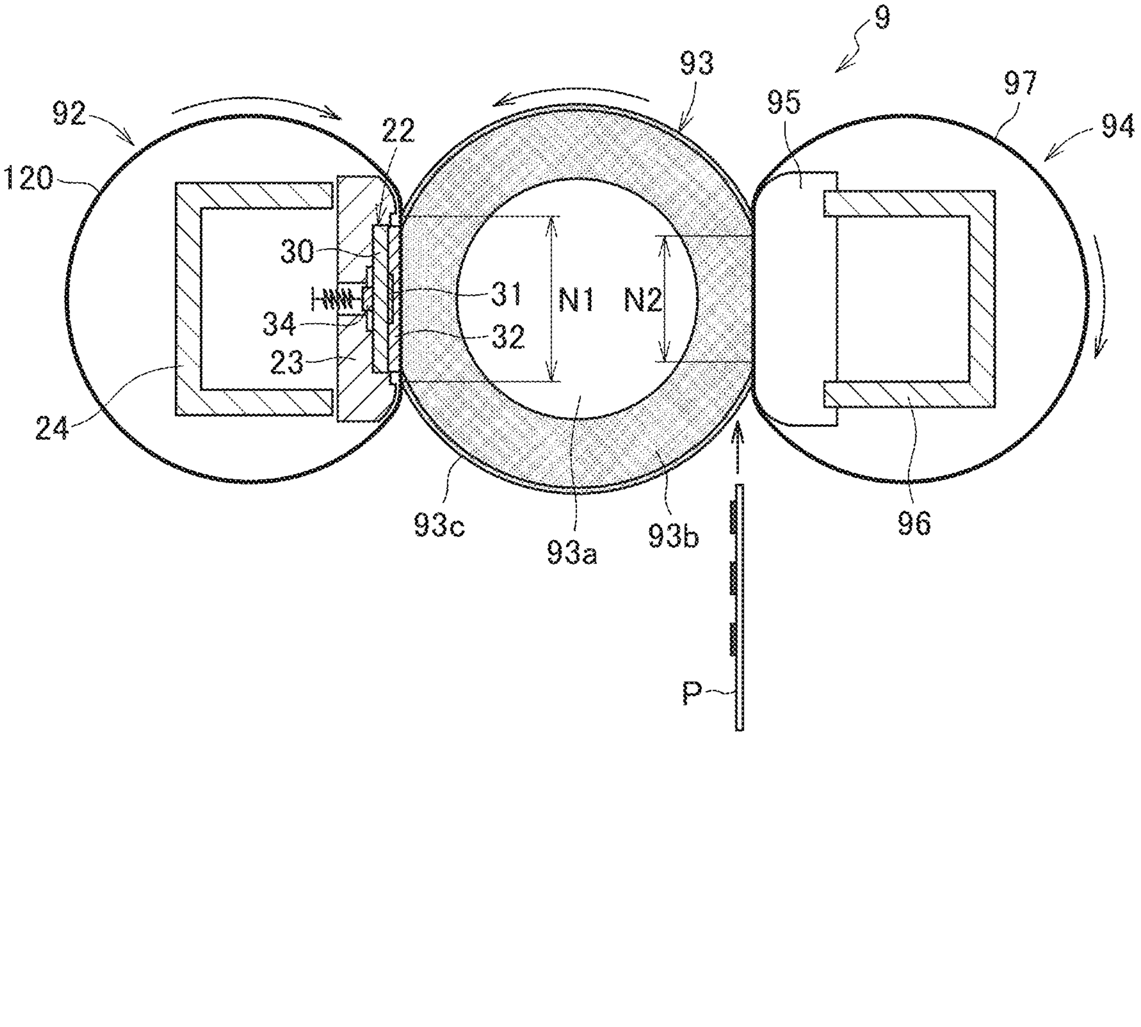
FIG. 18 is a schematic diagram illustrating a configuration of yet another fixing device.

The embodiments of the present disclosure are also applicable to fixing devices as illustrated in FIGS. 16 to 18, respectively, other than the fixing device 9 described above. The configurations of fixing devices illustrated in FIGS. 16 to 18 are briefly described below.

First, the fixing device 9 illustrated in FIG. 16 includes a pressurization roller 44 opposite the pressure roller 21 with respect to the fixing belt 20. The pressurization roller 44 is an opposed rotator that rotates and is opposite the fixing belt 20 as the rotator. The fixing belt 20 is sandwiched by the pressurization roller 44 and the heater 22 and heated by the heater 22. On the other hand, a nip formation pad 45 serving as a nip former is disposed inside the loop formed by the fixing belt 20 and disposed opposite the pressure roller 21. The nip formation pad 45 is supported by the stay 24. The nip formation pad 45 sandwiches the fixing belt 20 together with the pressure roller 21, thereby forming the fixing nip N.

Next, a description is given of in the fixing device 9 illustrated in FIG. 17, which does not include the above-described pressurization roller 44. The fixing device 9 includes a heater 22 that is formed in an arc shape conforming to the curvature of the fixing belt 20 so as to secure a circumferential contact length between the fixing belt 20 and the heater 22. The fixing device 9 illustrated in FIG. 17 is identical to the fixing device 9 illustrated in FIG. 16 in terms of the others.

Finally, the fixing device 9 illustrated in FIG. 18 is described. The fixing device 9 includes a heating assembly 92, a fixing roller 93 that is a rotator and a fixing member, and a pressure assembly 94. The heating assembly 92 includes the heater 22, the heater holder 23, the stay 24, and the heating belt 120. The fixing roller 93 includes a core 93*a*, an elastic layer 93*b*, and a release layer 93*c*. The core 93*a* is a solid core made of iron. The elastic layer 93*b* coats the circumferential surface of the core 93*a*. The release layer 93*c* coats an outer circumferential surface of the elastic layer 93*b*. In addition, the fixing device 9 includes a pressure assembly 94 opposite the heating assembly 92 via the fixing roller 93. The pressure assembly 94 includes a nip formation pad 95, a stay 96, and a pressure belt 97 as the pressure rotator. The pressure belt 97 includes the nip formation pad 95 and the stay 96 that are inside the loop of the pressure belt 97. The pressure belt 97 is rotatably provided. The sheet P passes through the fixing nip N2 between the pressure belt 97 and the fixing roller 93 and is applied to heat and pressure, and the image is fixed on the sheet P.

In the fixing devices illustrated in FIGS. 16 to 18, the surface layer of the pressure roller 21 (or the pressure belt 97) is charged, which similarly causes the fixing failure or the electrostatic offset. Accordingly, the discharger may be in contact with the surface layer of the pressure roller 21 (or the pressure belt 97) and grounded similar to the above-described embodiments. The discharger can remove the charge on the surface layer of the pressure roller 21 (or the pressure belt 97) to prevent the fixing failure and the electrostatic offset. In addition, grounding the discharger via the first resistor reduces the current flowing to the ground. Disposing the first resistor between the discharger and the fixing device frame in the direction of the current flowing from the pressure roller 21 (or the pressure belt 97) to the ground prevents the adverse effect on the electronic components around the fixing device and the charging of the components around the fixing device (that is the components outside the fixing device and inside the image forming apparatus).

A heating device according to the present disclosure is not limited to the fixing device described in the above embodiments. The heating device according to the present disclosure is also applicable to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to the above heating device can prevent components around the heating device from charging.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:

a planar heater;

a rotator including a conductive layer, the rotator grounded via the conductive layer;

a pressure rotator having a conductive outer surface and being configured to press the rotator;

a heating device frame holding the pressure rotator;

a resistor;

a rectifier coupled in series to the resistor;

a discharger being in contact with the conductive outer surface of the pressure rotator and grounded via the rectifier, the resistor, and the heating device frame; and another rectifier coupled to the conductive layer, the another rectifier configured to flow a current in a direction opposite to a current flowing through the rectifier, wherein the rectifier and the another rectifier are grounded via the resistor, and the rectifier is coupled in series to the discharger.

2. The heating device according to claim 1, wherein a resistance value of the resistor is $(10/3.5)\times10^4$ Ω or more.

3. The heating device according to claim 1, wherein a resistance value of the resistor is $1.0\times10^5$ Ω or more.

4. The heating device according to claim 1, further comprising at least two resistors including the resistor, wherein the discharger is grounded via the at least two resistors coupled in series.

5. The heating device according to claim 4, wherein a resistance value of each of the at least two resistors is $(10/3.5)\times10^4$ Ω or more.

6. The heating device according to claim 4, wherein a resistance value of each of the at least two resistors is $1.0\times10^5$ Ω or more.

7. The heating device according to claim 1, wherein the pressure rotator includes a non-conductive intermediate layer having a thickness of 2.5 mm or more and 6.0 mm or less.

8. The heating device according to claim 7, wherein the thickness of the intermediate layer is larger than or equal to 2.5 mm in a pressure state in which the pressure rotator is pressed against the rotator.

9. The heating device according to claim 1, further comprising a ball bearing, wherein the heating device frame holds the pressure rotator via the ball bearing.

10. The heating device according to claim 1, wherein the rectifier is disposed between the heating device frame and the discharger in a path of current flowing between the heating device frame and the discharger.

11. The heating device according to claim 1, further comprising another resistor, wherein the rotator is grounded via said another resistor.

12. A fixing device comprising:

the heating device according to claim 1.

13. A dryer comprising the heating device according to claim 1.

14. A laminator comprising:

the heating device according to claim 1.

15. The heating device according to claim 1, wherein the rotator is grounded via the conductive layer and the hea4ting device frame.

* * * * *